(12) United States Patent
Van Der Laan

(10) Patent No.: US 9,980,546 B2
(45) Date of Patent: May 29, 2018

(54) CARD HOLDER

(71) Applicant: APE B.V., Amsterdam (NL)

(72) Inventor: Lennert Van Der Laan, Amsterdam (NL)

(73) Assignee: Ape B.V., Amsterdam (NL)

( * ) Notice: Subject to any disclaimer, the term of this patent is extended or adjusted under 35 U.S.C. 154(b) by 0 days. days.

(21) Appl. No.: 15/259,493

(22) Filed: Sep. 8, 2016

(65) Prior Publication Data

US 2017/0065047 A1    Mar. 9, 2017

(30) Foreign Application Priority Data

Sep. 8, 2015   (NL) ...................... 2015415

(51) Int. Cl.
| | | |
|---|---|---|
| *A45C 11/18* | (2006.01) | |
| *A45C 13/02* | (2006.01) | |
| *B33Y 50/02* | (2015.01) | |
| *G06K 19/04* | (2006.01) | |

(52) U.S. Cl.
CPC ............ *A45C 11/182* (2013.01); *A45C 11/18* (2013.01); *A45C 13/02* (2013.01); *B33Y 50/02* (2014.12); *G06K 19/042* (2013.01); *G05B 2219/49023* (2013.01)

(58) Field of Classification Search
CPC ....... A45C 11/182; A45C 11/18; A45C 13/02; B33Y 50/02; G06K 19/042
USPC ............................ 206/39.4–39.5, 449, 308.1
See application file for complete search history.

(56) References Cited

U.S. PATENT DOCUMENTS

| | | | | |
|---|---|---|---|---|
| 912,110 | A * | 2/1909 | Gill ...................... | A45C 11/18 206/39.5 |
| 1,670,343 | A * | 5/1928 | Clemens ................ | A45C 11/18 206/39 |
| 4,817,253 | A * | 4/1989 | Harmatuik ........... | A45C 11/182 150/137 |
| 4,852,727 | A * | 8/1989 | Oberle ................. | A45C 11/182 206/39.4 |
| 4,887,739 | A * | 12/1989 | Parker ................... | A45C 11/18 221/155 |
| 5,718,329 | A * | 2/1998 | Ippolito ............... | A45C 11/182 150/147 |
| 5,938,010 | A * | 8/1999 | Osterbye .............. | A45C 11/182 206/38 |
| 6,412,627 | B1 * | 7/2002 | Tiscione .............. | A45C 11/182 150/147 |

(Continued)

FOREIGN PATENT DOCUMENTS

| | | |
|---|---|---|
| DE | 297 10 774 U1 | 9/1997 |
| WO | 2010/137975 A1 | 12/2010 |
| WO | 2014/098580 A1 | 6/2014 |

*Primary Examiner* — Chun Cheung
(74) *Attorney, Agent, or Firm* — Shewchuk IP Services, LLC; Jeffrey D. Shewchuk

(57) ABSTRACT

A card holder for holding bank cards and presenting them in a staggered fashion, said card holder comprising a housing, said housing comprising main walls and side walls so as to define a space for housing bank cards. It further comprises an element having a plurality of steps. With the present card holder, the element being resilient. One end of the card holder comprises a cut out for bringing the bank cards to a position where the element is pushed below the bank cards and from where gravity move the cards to the staggered position, the bank cards resting on the steps.

4 Claims, 5 Drawing Sheets

(56) References Cited

U.S. PATENT DOCUMENTS

| | | | | |
|---|---|---|---|---|
| 6,581,762 B2* | 6/2003 | Keough | ............... | A45C 11/182 |
| | | | | 206/39.4 |
| 8,899,411 B2* | 12/2014 | Van Geer | ............. | A45C 11/182 |
| | | | | 206/39.4 |
| 2014/0014676 A1 | 1/2014 | Minson | | |

* cited by examiner

CARD HOLDER

The present invention relates to a card holder for bank cards, said card holder
comprising a housing, said housing comprising
a first main wall and second main wall,
a first side wall and a second side wall connecting the first main wall and the second main wall so as to define a space for housing bank cards,
a first end and a second end, the second end providing an opening for receiving and dispensing the bank cards;
being capable of
holding the bank cards in a first position of the bank cards in which the bank cards are received in the housing to a relatively large extent, and
presenting bank cards in a staggered arrangement partially extending through the opening at the second end from said housing in a second position of the bank cards in which the bank cards are received in the housing to a reduced extent; and
comprising an element comprising a plurality of steps for supporting and presenting the bank cards in the second position, said plurality of steps comprising
stop surfaces facing the opening at the second end,
and front surfaces facing the first side wall.

Card holders are generally known. They are used to hold a customer loyalty card or a bank card, such as a cash card or a credit card etc., and provide some protection against damage such as scratches. The card holders comprise a housing that is in general made of plastic or metal.

Because people often have more than one card, card holders are known capable of holding more than one card. Then, the user will have to select which card to extract from the card holder. To facilitate this, there are card holders according to the preamble capable of displaying the cards in a staggered fashion, with the cards partially extending from the housing. This provides the user with an overview, and the desired card can be conveniently extracted from the card holder.

An example of a card holder according to the preamble is disclosed in WO2014/098580. It comprises a hinged element with a relief profile comprising steps (FIG. 5). Individual cards rest on individual steps, and movement of the element along a side of the housing will extend the cards in a staggered arrangement from the opening of the housing. The width of the housing is chosen such that the cards are tightly held by the housing so as to avoid inadvertent release from the card holder.

It is an object of the present invention to provide an alternative card holder.

To this end, a card holder according to the preamble is characterized in that
the element is capable of being
in a first position relatively close to the second side wall, and
in a second position relatively far from the second side wall,
the element being resilient and requiring force to be pushed from the first position to the second position;
wherein the distance between the first side wall and the second side wall is chosen such that gravity allows movement of the bank cards
from a third position of the bank cards with the second position of the bank cards between the third position of the bank cards and the first position of the bank cards,
to the second position of the bank cards under the force of gravity;
and at the first end the first wall of the card holder comprises a first cut out for bringing the bank cards from the first position to the third position.

Thus a simple card holder is provided. In use, using the first cut out, the cards are moved towards the third position, allowing the element to go from the second position to the first position with the steps below the bank cards, and then the cards are let go, allowing gravity to move the cards from the third position to the second position because they are not tightly held in the third position. The steps of the element act as a stop for the individual cards, resulting in the staggered arrangement of the cards. To move the cards to the first position, the user will exert force (e.g. using a finger) on the cards and push them towards the first end. The cards have rounded corners, and they push against the steps, causing the element to move from the first position to the second position. In the first position, the side of the element facing the cards are held, e.g. tightly held, using any of various methods, e.g. using a piece of felt or foam on the second side wall.

Because in the second position, the cards are not tightly held, it is more convenient to extract a particular card from the card holder.

For the card holder according to the present invention, the length of the card holder between the first end and the second end can be relatively short.

The card holder does not require a lever or the like at the outside of the card holder that may get caught, causing inconvenience and possibly causing the bank cards to move towards the second end.

The element may be an integral part of the housing, in particular of the first side wall, for example if manufactured from a resilient plastic. Being an integral part facilitates manufacturing and reduces cost. The element may take the form of a lip extending towards the first end of the card holder with its free distal end pointing away from the second end. Alternatively, the resilient property of the element is provided by a spring capable of pushing against a relatively rigid member comprising the steps.

According to a favourable embodiment, the first main wall cut out opens up at the first end of the card holder.

This allows easy access for a finger to move the cards towards the opening at the second end of the card holder. It obviates the need for a further element. It also reduces the amount of material for the first main wall, thus reducing cost. If of the first wall and the second main wall, it is only the first main wall that has a main cut out opening up at the first end, the risk of accidentally dislodging the cards is reduced.

According to a favourable embodiment, the second main wall comprises a second main wall cut out that opens up at the first end of the card holder.

This embodiment is somewhat more convenient to operate using a finger.

According to a favourable embodiment, at the second main wall a guide is provided for a slidable element so as to move said slidable element between a first position and a second position in a direction parallel to the direction from the first end to the second end, said slidable element comprising at the second end of the card holder a stop protruding in a direction from the second main wall to the first main wall.

The slidable element may perform several functions. Firstly, it may prevent accidental ejection of bank cards if they are moved too quickly towards the third position. In addition or alternatively, the stop may act as a stop to prevent accidental release of cards as an alternative to clamping the cards at a location thereof close to the first end while in the first position of the cards.

The slidable element is preferably removable, so people may remove the slidable element once they understand how to operate the present card holder. The slidable element is preferably resilient, allowing the stop to be moved backwards to facilitate removal of a card from the card holder while the card is in the second position. If the guide comprises a slot, this slot may serve another purpose, such as holding banknotes.

The slidable element may also comprise a further stop relatively close to the first end of the card holder that will engage the second main cut out if present, thus limiting the travel length of the slidable element. The distance between the two stops of the slidable element will in general be between 0.5 and 1.5 times the length of a bank card, and preferably between 0.7 and 1.2 times the length of a card.

Finally, the present invention relates to a computer-readable medium having computer-executable instructions adapted to cause a 3D printer to print, wherein the computer-executable instructions are adapted to cause a 3D printer to print at least the housing of the card holder according to the preceding claims.

The present invention will now be illustrated with reference to the drawing where FIG. 1A and FIG. 1B show a perspective views and a rear view respectively of a card holder;

Figure 1A:
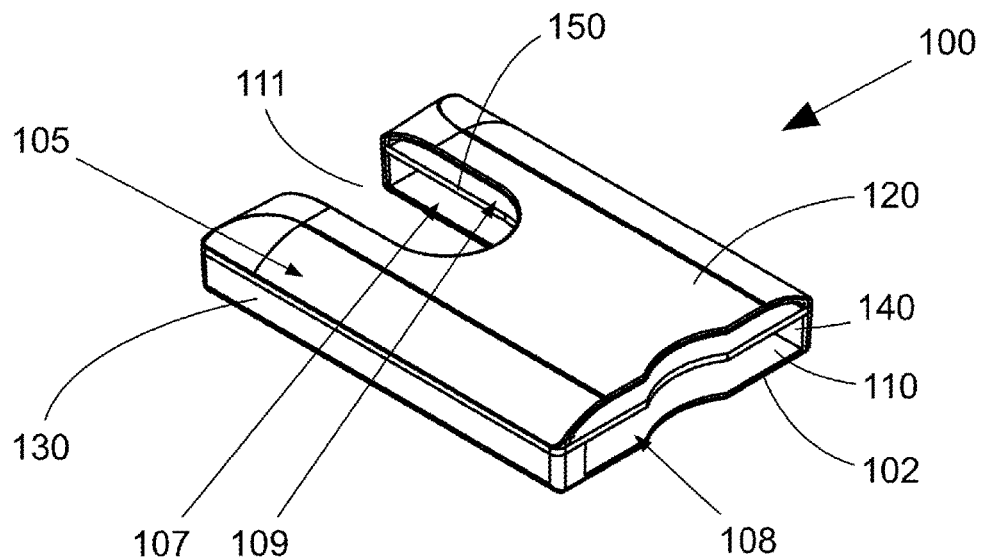
Figure 1B:
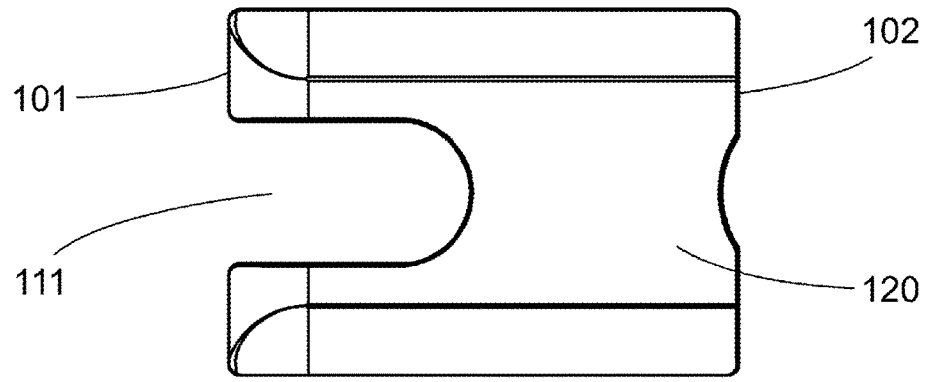

FIG. 1A and FIG. 1B show respectively a perspective view, and a rear view of a card holder 100 comprising a housing 105 having a first end 101 and a second end 102. The housing 105 comprises a first main wall 110 and a second main wall 120 parallel to the first main wall 110 connected by a first side wall 130 and a second side wall 140 so as to define a first space 107 for housing bank cards, to be received via opening 108 at the second end 102.

In the embodiment shown, there is an intermediate wall 150, resulting in a second space 109 the function of which will be explained with reference to FIG. 5.

At the first end there is a first cut out 111 allowing a user to push bank cards received in the first space 107 with his finger towards the second end 102.

Figure 2:
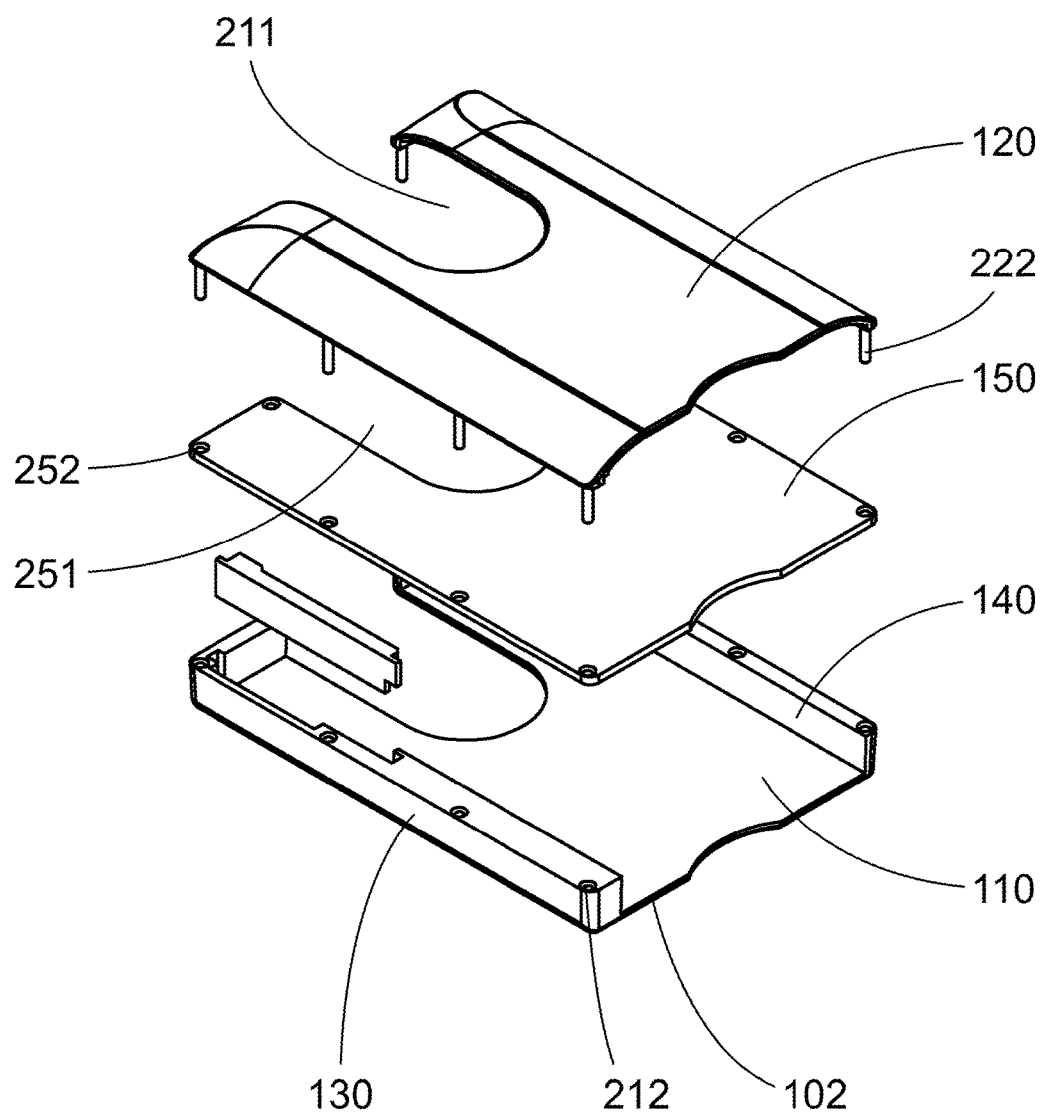
FIG. 2 shows an exploded view of the card holder of FIG. 1A.

In the embodiment shown, the second main wall and the intermediate wall 150 have a similar cut out (see FIG. 2).

FIG. 2 shows an exploded view of the card holder 100 of FIG. 1A, demonstrating also how the card holder 100 can be assembled easily.

The second main wall 120 comprises pins 222 and the first main wall 110 comprises corresponding recesses 212 for snugly receiving said pins 222. Thus the recesses 212 hold the second main wall 120 fixedly.

The intermediate wall 150 has through-holes 252 allowing the passage of the pins 222.

In the embodiment shown, the second main wall 120 and the intermediate wall 150 have similar cut outs as the first cut out 111, i.e. second cut out 211 and intermediate cut out 251.

Figure 3A:
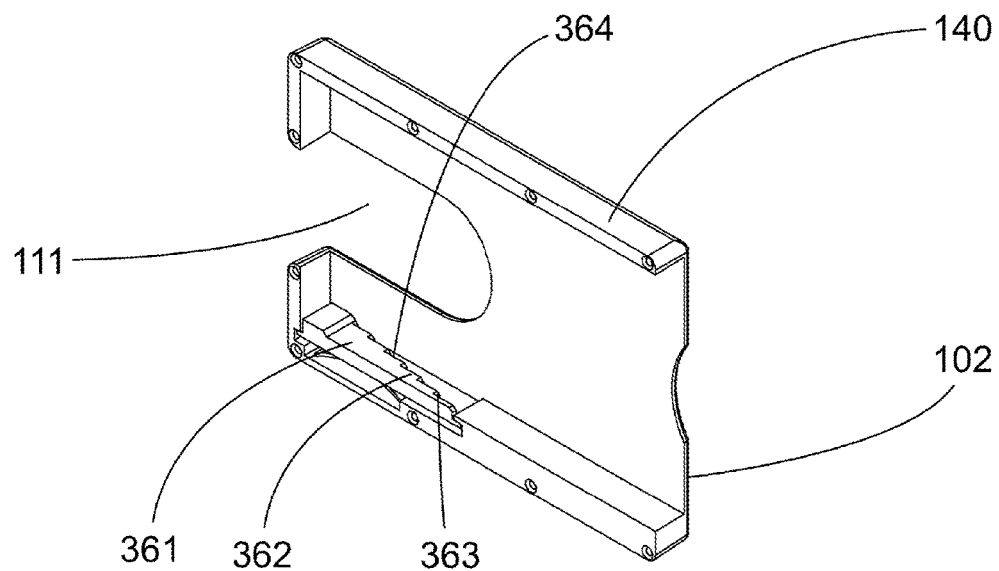
FIG. 3A and FIG. 3B show a perspective view of the inside of a part of a housing of the card holder of FIG. 1A.
Figure 3B:
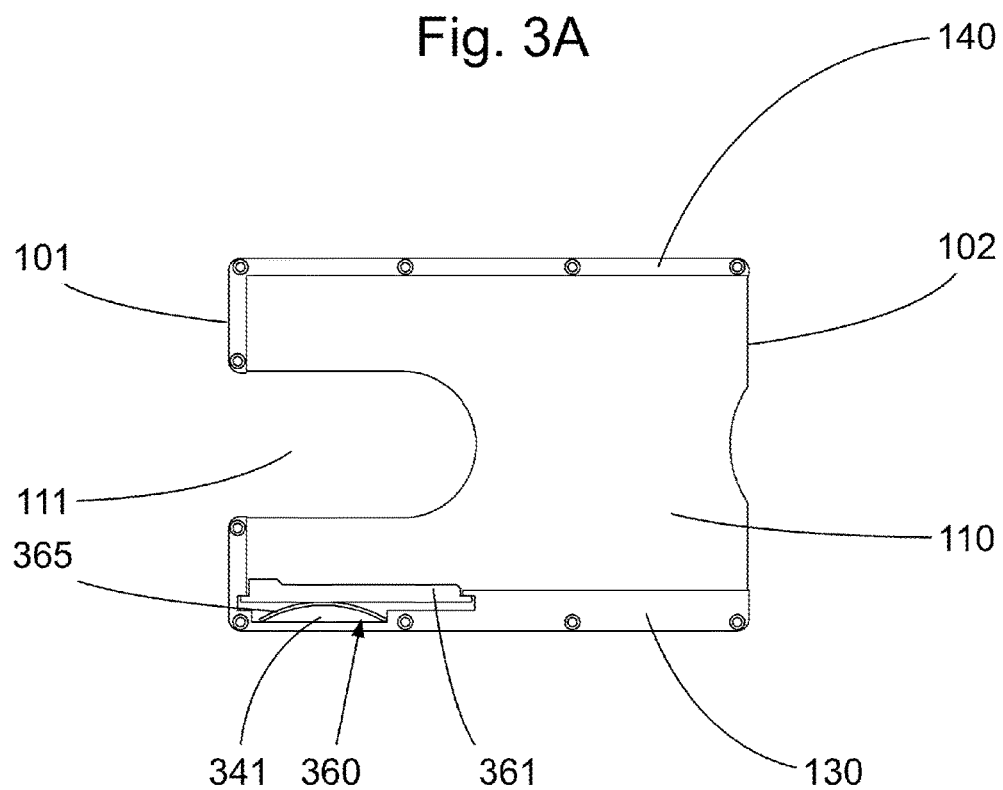

FIG. 3A shows a perspective view and FIG. 3B a side view of the inside of a part of housing 105, and in particular that part comprises the first main wall 110, the first side wall 130 and the second side wall 140.

The first side wall 130 comprises a recess 341 provided with an element 360 comprising a plastic member 361 comprising a plurality of steps 362. The steps 362 have stop surfaces 363 facing the second end 102 that will act as stops for the bank cards to rest on, as will be explained later. The steps 362 also comprise front surfaces 364 facing the first main wall 110.

The element 360 also comprises a spring 365 pushing the plastic member 361 that is held in the recess 341 towards the second side wall 140. Thus, the element 360 is in its first position. In the second position, the member 361 is farther away from the second side wall 140, and received in the recess 341 to a larger extent.

FIG. 2 is incomplete in that spring 365 is not shown.

Figure 4:
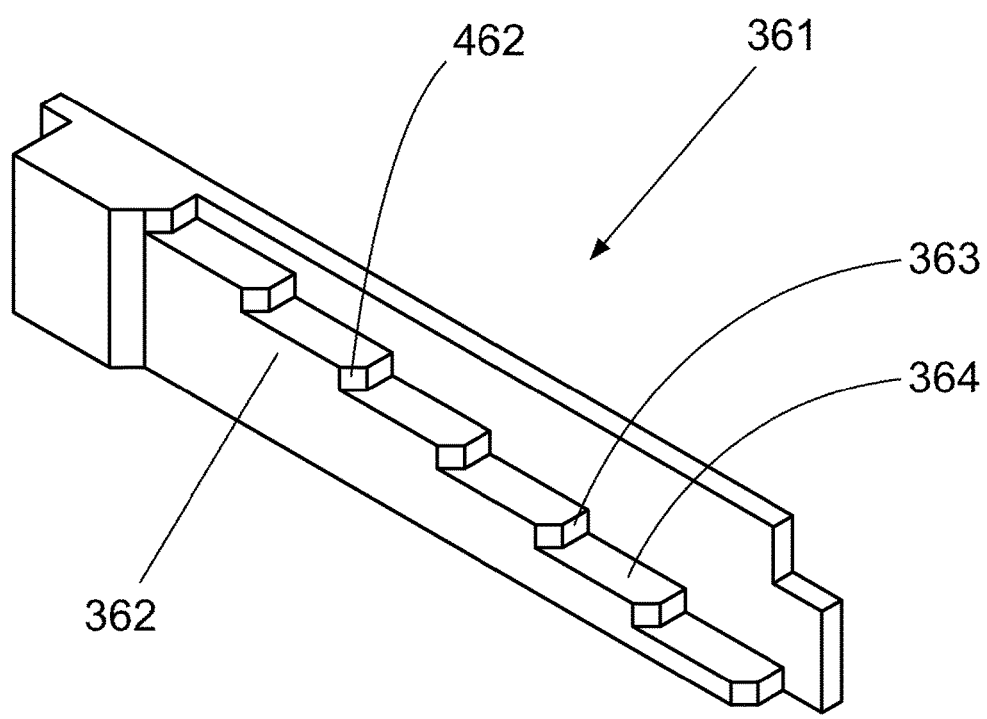
FIG. 4 shows a member of the bank card holder capable of serving as a stop for bank cards.

FIG. 4 shows a perspective view on the plastic member 361 which is part of the element 360. The member 361 acts as a stop for bank cards, as will be explained now.

With bank cards introduced in the first space 107, the bank cards are in a first position and push the member 361 away from the second side wall 140, compressing the spring 365. Thus the bank cards are held, even with the card holder 100 held upside down.

With the card holder 100 held with the second end 102 up, the bank cards can be pushed upwards using a finger, making use of the cut outs of the card holder 100, until the lower ends of the bank cards are above the stop surfaces 363.

With the bank cards raised to this third position, the member 361 is pushed by the spring 365 towards the second side wall 140, although the member 361 is retained in the recess 341. Thus the steps 362 are moved below the bank cards.

When the finger is removed, the bank cards fall down by gravity and are stopped by the stop surfaces 363. Now the bank cards are in the second position, in which the bank cards are arranged in a staggered fashion after their return towards the first end under the influence of gravity. Because of their staggered nature, the bank cards will be presented to a user facing the first main wall 110, with the bank cards further away higher.

Now the user can conveniently select the desired bank card (or other standard card, such as a customer card, a library card, driving license, ID, etc.).

Thanks to the rounded corners of bank cards, and helped by sloped surfaces 462, pushing the bank cards from the second position towards the first position pushes the member 361 further into the recess 341.

Figure 5A:
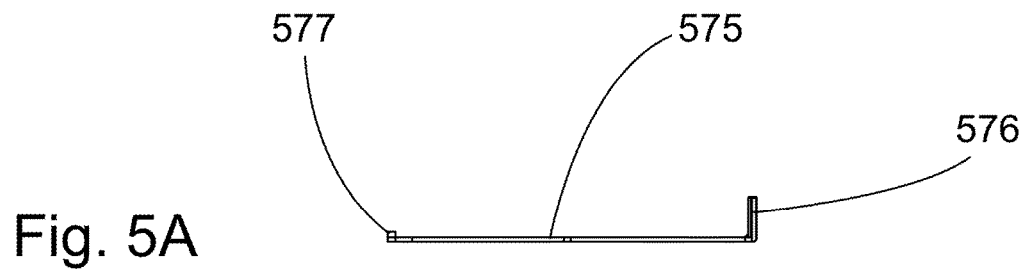
FIG. 5A-FIG. 5C show a slidable element for the card holder of FIG. 1A.
Figure 5B:
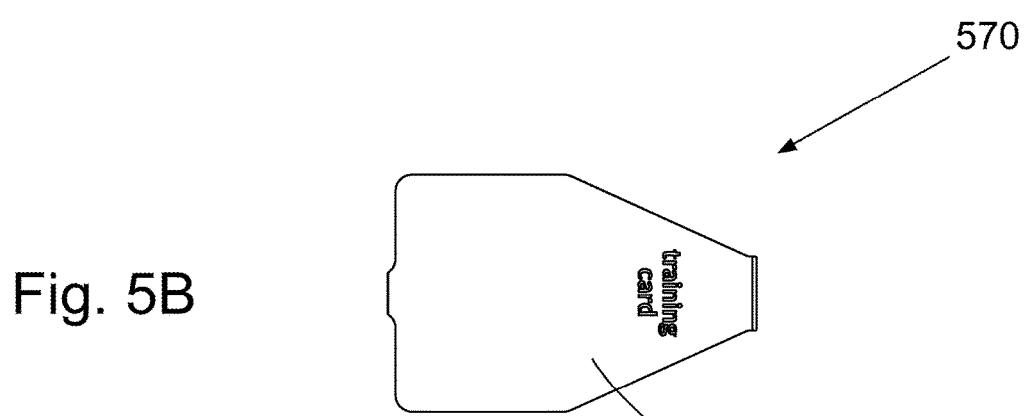
Figure 5C:
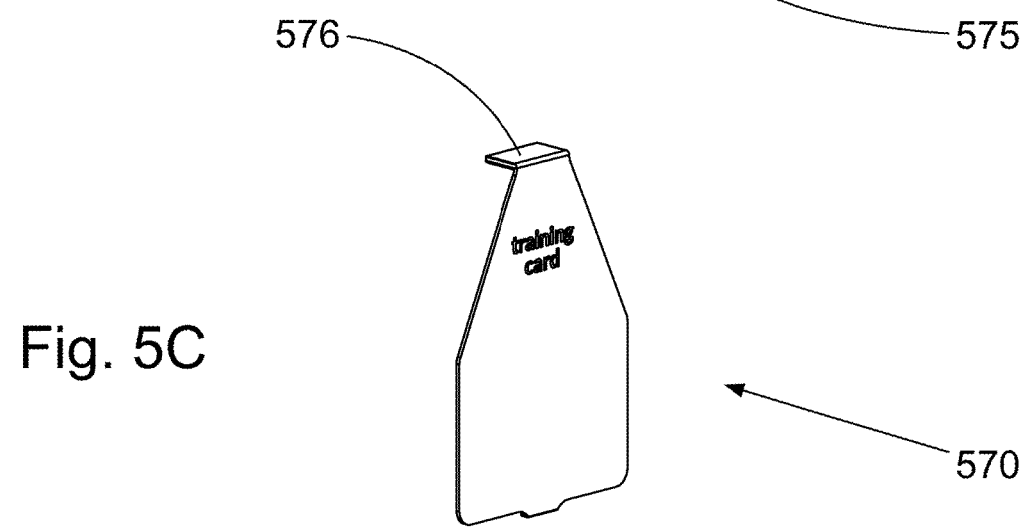

FIG. 5A to FIG. 5C show respectively a cross sectional view, a front view and a perspective view of a slidable element 570 for the card holder 100 shown in FIG. 1A.

The slidable element 570 is a training card of flexible material such as plastic. It comprises a main body 575, and a stop 576. It also comprises a further stop 577.

While the card holder 100 according to the present invention is easy to operate, a novice user might experience that the force with which the bank cards are moved to the second position is too great, and bank cards are ejected from the card holder 100. To prevent this, the slidable element 570 is introduced into the second space 109, with the stop 576 facing towards the plane of the first side wall 130.

Now, if the bank cards are moved towards the third position, the slidable element 570 will move along until the further stop 577 latches in the intermediate cut out 251 (or, if it faces rear ward, the second cut out 211). If too much force has been added, the bank cards are blocked by the stop 576 and return to the second position by gravity.

Once a user has the hang of the card holder 100, he may remove the slidable element 570 and use the second space 109 for something else, e.g. banknotes.

The invention claimed is:

1. A card holder for bank cards, said card holder comprising a housing, said housing comprising
   a first main wall and second main wall,
   a first side wall and a second side wall connecting the first main wall and the second main wall so as to define a space for housing bank cards,
   a first end and a second end, the second end providing an opening for receiving and dispensing the bank cards; being capable of
      holding the bank cards in a first position of the bank cards in which the bank cards are received in the housing to a relatively large extent, and
      presenting bank cards in a staggered arrangement partially extending through the opening at the second end from said housing in a second position of the bank cards in which the bank cards are received in the housing to a reduced extent; and
   comprising an element comprising a plurality of steps for supporting and presenting the bank cards in the second position, said plurality of steps comprising
      stop surfaces facing the opening at the second end,
      and front surfaces facing the first side wall;
characterized in that
   the element is capable of being
      in a first position relatively close to the second side wall, and
      in a second position relatively far from the second side wall,
   the element being resilient and requiring force to be pushed from the first position to the second position;
   wherein the distance between the first side wall and the second side wall is chosen such that gravity allows movement of the bank cards
      from a third position of the bank cards with the second position of the bank cards between the third position of the bank cards and the first position of the bank cards,
      to the second position of the bank cards under the force of gravity;
   and at the first end the first main wall of the card holder comprises a first cut out for bringing the bank cards from the first position to the third position.

2. The card holder according to claim 1, wherein the first cut out opens up at the first end of the card holder.

3. The card holder according to claim 2, wherein the second main wall comprises a second main wall cut out that opens up at the first end of the card holder.

4. The card holder according to claim 1, wherein at the second main wall a guide is provided for a slidable element so as to move said slidable element between a first position and a second position in a direction parallel to the direction from the first end to the second end, said slidable element comprising at the second end of the card holder a stop protruding in a direction from the second main wall to the first main wall.

* * * * *